United States Patent [19]

Hoefelmayr et al.

[11] 4,391,221

[45] Jul. 5, 1983

[54] METHOD FOR MECHANICAL MILK REMOVAL

[75] Inventors: Tilman Hoefelmayr, Niederteufen, Switzerland; Jakob Maier, Türkheim, Fed. Rep. of Germany

[73] Assignee: Biomelktechnik Hoefelmayr & Co., Niederteufen, Switzerland

[21] Appl. No.: 225,938

[22] Filed: Jan. 19, 1981

[30] Foreign Application Priority Data

Jan. 21, 1980 [DE] Fed. Rep. of Germany ....... 3001963
Dec. 17, 1980 [DE] Fed. Rep. of Germany ....... 3047579

[51] Int. Cl.³ .................................................. A01J 5/16
[52] U.S. Cl. ............................... 119/14.08; 119/14.14
[58] Field of Search ............... 119/14.02, 14.07, 14.08, 119/14.14, 14.27, 14.28

[56] References Cited

U.S. PATENT DOCUMENTS

| | | | |
|---|---|---|---|
| 2,434,586 | 1/1948 | Reynolds | 119/14.28 X |
| 3,236,207 | 2/1966 | Happel | 119/14.47 X |
| 3,754,532 | 8/1973 | Troberg et al. | 119/14.08 |
| 3,783,837 | 1/1974 | Olander | 119/14.08 |
| 4,011,838 | 3/1977 | Nordegren et al. | 119/14.08 |
| 4,034,714 | 7/1977 | Umbaugh et al. | 119/14.18 |
| 4,190,021 | 2/1980 | Reisgies | 119/14.08 X |

FOREIGN PATENT DOCUMENTS

| | | |
|---|---|---|
| 1482320 | 12/1971 | Fed. Rep. of Germany . |
| 2746310 | 4/1978 | Fed. Rep. of Germany . |
| 2710888 | 9/1978 | Fed. Rep. of Germany . |

*Primary Examiner*—Robert P. Swiatek
*Attorney, Agent, or Firm*—Flynn, Thiel, Boutell & Tanis

[57] ABSTRACT

A method for mechanical milk removal in which a predetermined underpressure is applied to the interior of a milking cup applied to a teat to remove the milk and, if desired, a pulsation of a teat rubber is effected at a predetermined frequency and intensity, and while the milking cup is in place the teat is stimulated for a predetermined interval prior to the principal milking operation. The invention also relates to an apparatus for executing the method comprising a pulsator connected on the one hand to an underpressure source and on the other hand to pulsator lines supplying the pulse spaces of the milking cup, the pulsator having two membranes which are interconnected by a linkage and which subdivide each pressure cell into two separate spaces, two spaces of which communicate with one another via a throttle, if desired adjustable, while the two other spaces of which are adapted to be selectively connected via a control unit to the underpressure source, and further comprising a switch-over device which is connected to the linkage and which serves to selectively connect one or two group(s) of pulsator lines to the underpressure source and to fresh atmospheric air.

35 Claims, 4 Drawing Figures

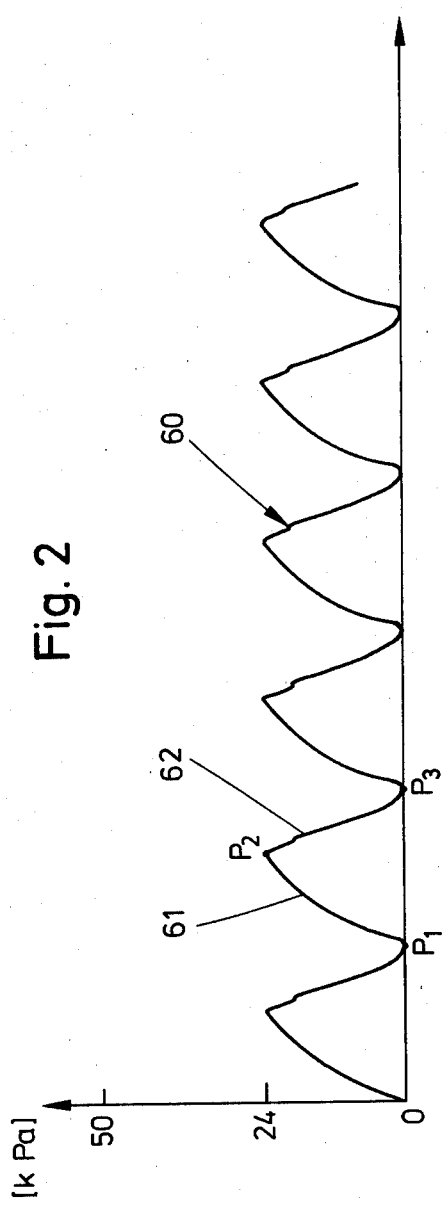
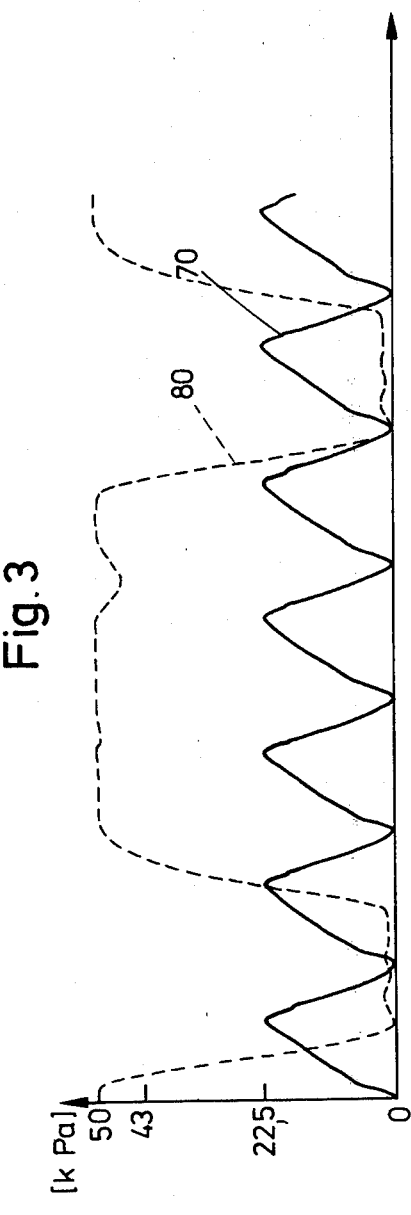

METHOD FOR MECHANICAL MILK REMOVAL

FIELD OF THE INVENTION

This invention relates to a method and apparatus for mechanical milk removal and stimulation of the teat prior to initiation of the principal milking operation.

BACKGROUND OF THE INVENTION

Those species of animals which mankind uses to obtain milk by mechanical means such as cows, sheep and goats are by their nature animals which flee from danger. They are thus equipped with a mechanism which can cause the supply of milk to be cut off directly in case of imminent danger. This phenomenon is known and feared by all dairy workers as the so-called "milk pull-up reflex". The basic prerequisites for milk removal are therefore that first of all the animal to be milked be free of fear and have a feeling of security, calm and general well-being. By accustoming the animals to the milking operation, by developing milking methods involving no direct pain, and by selecting the animals for their milking willingness and output, the cases of total milk pull-up are rare nowadays. In addition to totally blocking the milk supply, some animals also exhibit partial blockage which fluctuates within a wide range and expresses itself in an unwillingness of the animal to give milk.

Depending on the breed of animal and the selection, there are clear differences in the animal's accustomedness to milking machines. These differences are revealed in the degree to which the udder can be emptied by the mechanical milking operation. There is one single breed of milk-giving sheep, Sardinian sheep, which are known to have good milkability. The main mechanical milking in this breed amounts to between 81 and 87%, the finish milking varying between 19 and 13%. On the average, the finish milking in breeds of sheep currently milked by machine amounts to approximately 37%. It is significant in this context that the degree of milk production by machine is so inadequate, even in breeds of sheep which are considered to have been bred well (Assaf, improved Awassi sheep), that even twin lambs, which are allowed to nurse after milking, have no difficulty in obtaining that quantity of milk required for their growth. This example documents particularly well the fact that suitable stimulation is quite obviously needed to be able in fact to withdraw all milk. This fact is confirmed by a new scientific study of seven breeds of sheep. In this study, the number of animals completely milked by machine increased on the average from 49% to 76% owing to stimulation. This increase was approximately the same in all seven breeds. Moreover, according to this study, the positive effect of udder emptying by stimulation was that the increase in the quantity of milk obtained corresponded approximately to the decline in the manual finish milking.

Rapid strides in the breeding of dairy cows have been made in the past thirty years concomitant with the general introduction of the milking machine. Today there are high-performance breeds (Holstein Frisian, German Braunvieh, German Schwarzbunte, Danish Rote) and crossbreeds (Israel Frisian, brown Swiss, Braunvieh x Holstein Frisian) which can be milked very completely by machine and yield very high milk output. On the other hand, however, the classical breeds (German Fleckvieh, Swiss Braunvieh) are quite topical and widely distributed due to a number of different breeding aims (e.g. emphasis placed on meat production, lower sensitivity, lower requirements placed on the fodder). These animals also allow themselves to be milked readily, although satisfactory emptying of the udder is only possible after adequate stimulation. But even then, the high degree of udder emptying achieved in pure breeds of dairy cows is not always attained. As scientific studies have shown, however, these breeds also react quite positively as far as annual milk and fat production are concerned (in the magnitude of +10%), if adequate stimulation (lasting from 40 to 60 seconds) is performed continuously instead of the conventional preparation of the udder (lasting from 12 to 20 seconds). Good stimulation at the beginning of lactation also directly affects the growth of the mammary gland.

The animal's willingness to give milk is basically evoked by stimulation. This applies both for the natural suckling act and for mechanical milk removal. Stimulation is a very complex process. Triggered by the stimulation stimulus, nerve reflexes relax the smooth muscles of the udder, thereby allowing in particular the fine milk ducts to dilate. Moreover, the pituitary gland secretes the hormone ocytocin into the bloodstream causing a contraction of the cells of the connective tissue septa (Körbchenzellen) which surround the milk-forming alveoli. This causes the milk, which is continuously secreted into the alveoli, to be pressed out of the spongy structure of the gland (milk ejection), thus allowing it to flow into the lower cavities in the udder and be accessible to milking. The milk ejection causes the internal udder pressure to increase to approximately 30 to 60 mbar, thereby causing the teats, promoted by an increase in the blood supply, to become engorged and open the constriction between the teat cistern and the gland cistern (the annular fold or "Fürstenberg'sche Venenring"). Only now is the animal ready to be milked.

Depending on the species and breed of milk-giving animals, optimum milk output is possible only by a rapid and careful removal of the milk immediately after adequate milk ejection.

The most complete possible emptying of the udder is of utmost importance for milk production because (apart from the quantity of gland tissue and its metabolic activity) the secretion rate is dependent on the space available. The internal udder pressure increases as the storage volume is increasingly filled. Since milk secretion is accomplished against this pressure, it slows down as the degree of filling of the storage volume increases. Owing to these circumstances, the opinion which is sometimes voiced to the effect that the milk which is not removed during the preceding milking operation will also be available due the next milking operation is wrong. On the contrary, this milk is lost forever. If the udder is continuously emptied incompletely over a long period of time, this will directly result in a reduction of the daily output, in a deterioration of the animal's endurance and in a reduction of the lactation time. The influence of the degree of udder emptying on milk output is revealed the best by high-grade cows, and the least by goats, since the storage volume of the gland cisterns compared to the glandular tissue is substantially higher in cows.

It can be said in general that the better the stimulation, the more quickly and more completely milk can be obtained. If stimulation is poor, the amount of milk obtained during finish milking increases together with the amount of manual work during milking. This increase in the amount of finish milking also goes hand-in-hand with an increase in udder diseases.

Stimulation can also be effected in principle by various types of stimuli, e.g. tactile, thermal, visual, acoustical and olfactory. The greatest importance is attributed in this context to the contact and pressure receptors in the teat and the teat base. These are simulated by teat massage during manual stimulation until milk ejection occurs. The milker must allow at least 45 to 60 seconds for this. In cows, this means a mathematical average of almost double the routine time the milker accords per animal compared to the case in which there is no stimulation whatsoever preceding milk removal. Practically speaking, however, the prolongation of the routine time is less because good stimulation means that the amount of finish milk will be distinctly less, thus requiring less manual work to obtain it.

The calculation from the viewpoint of economical working is especially poor in the case of sheep, particularly because only about 10 percent of the milk obtained from a cow is obtained per milking operation from sheep. Even if hand milking, which is common in the case of sheep, were abandoned entirely, the introduction of previous manual stimulation would still reduce the work productivity, which is low in any case, by 40%. Consequently, stimulation of sheep is practised nowhere nowadays.

One must realise on the other hand that the degree of udder emptying achieved without stimulation also fluctuates very markedly from one animal to another within the same herd. Drastic drops in output and udder diseases are the necessary consequence in animals which can be milked only very incompletely without stimulation. Such udder diseases are fatal as a rule in sheep. Moreover, unprejudiced economical considerations show that ultimately no rationalisation with a view to economical working can be so great as to compensate for only slight losses in milk production. Hence, from the economical point of view, there is no alternative to the most complete possible milk production, i.e. adequate stimulation, in all milk-giving animals.

Various attempts have long been made in practice to mechanise the work of stimulation. For instance, a large variety of special-purpose brushes, vibrators and massaging means are known. These devices, however, all suffer from the drawback that the milker is still bound to the animal during the entire stimulation period. Hence, these devices achieve no savings of routine time. Furthermore, such devices usually stimulate the udder itself more than the teats, although stimulating the teats is considerably more effective.

Endeavours aimed at eliminating this drawback by semi-automation at least in the milking stall have not been successful, since the requisite positioning of the apparatus involves sophisticated technology which is accident-prone in rough, routine operation. In particular, however, this solution runs contrary to the fact that the necessary restriction in the freedom of movement of the animals frequently results in the feared "pull-up" reflex and thus, in effect, accomplishes exactly the opposite of effective stimulation. Such positioning involves great difficulties in particular in the case of restless sheep.

U.S. Pat. No. 3,554,166 already reveals an udder douche which provides for an apparatus to be placed on the floor with a plurality of upwardly directed nozzles from which a warm pressurised liquid can be sprayed against the udder. The drawbacks of such a solution are high water consumption, additional expense for heating the water and also considerable hygienic difficulties as any dirt on the udder which is dissolved by the water will run down and contaminate the teats. This can be remedied only by careful subsequent manual work.

According to U.S. Pat. No. 4,034,713, a separate device for stimulation in the stall is proposed in which one means containing a plurality of holders is provided per teat. The holders resiliently abut against the teat from various sides and have on their inwardly facing sides spray nozzles from which a warm liquid can be sprayed against the teats. The afore-mentioned apparatus, however, only serves to stimulate the teat. The milker must properly position it and remove it again at the end of the stimulation phase to be able to then apply the actual milking machine to the teats. These known stimulation devices which operate independently of the actual milking machine have shown that it is scarcely possible to ensure co-ordination between the stimulation and prompt application of the milking machine under practical conditions. If an animal is only willing to give milk for a brief time before milking, then not only does the stimulation effect disappear, but it even has an auxiliary negative effect on udder emptying in some cases. This is precisely what frequently happens in practice, because the milker as a rule operates several milking machines and is occupied with routine work, in particular positioning the machine and finishing milking another animal. As the number of milking machines increases to increase the work productivity, the milker finds himself in a continuous stress situation torn between the necessity of providing adequate stimulation, of applying the milking machine at the proper time, and of completely removing the subsequent machine milking without previous blind milking. In so doing, the milker is actually forced to decide in favour of one animal to the detriment of another.

In order to free the milker both from the actual stimulation work and from the difficulty of properly co-ordinating the individual work cycles at the beginning of the milking operation, milking machines were developed in which a preliminary phase intended to stimulate the animal precedes the main milking phase.

German AS No. 1,482,320, for example, already reveals a conventional milking procedure involving a double chamber milking cup, in which an underpressure and an atmospheric pressure are alternately applied by a pulsator to the milking cup interspace during the actual milking phase, whereas a constant underpressure prevails in the interior of the teat rubber. In this known milking machine the milking operation begins with the application of the milking cups to the teats, subsequent to which a stimulation phase is carried out such that an underpressure equal to the underpressure used during the milking phase is applied in the interior of the teat rubber. The pressure in the milking cup interspace, however, is increased above atmospheric pressure during the relaxation phase so that a greater fold-in of the teat rubbers results. This is supposed to have a massaging effect on the teats. The pressure increase in the pulsator line is returned to normal again only after the alveolar milk has ejected into the cisterns. It is not stated, however, how this is determined. Since the constant milking underpressure is already applied during the stimulation phase and the pulsator pressure gives evidence of a suction phase with the same parameters as during the milking operation, normal milk removal occurs in this case as soon as the milking cups are applied.

A milking method corresponding to German AS No. 1,482,320 is known from the article by L. Czech entitled "Automation in Milk Production" on page 164 of the periodical "Deutsche Agrartechnik", Vol. 21, No. 4, April 1971. In this procedure as well, the normal underpressure is applied to the interior of the milking cup right after the milking machine is applied to the animal. The control of the pulsator pressure, however, is varied such that a superpressure of 0.5 kp/cm$^2$ is introduced into the milking cup interspace during the relaxation cycle, while the pressure is dropped to the underpressure customarily used in the suction phase. Hence, a vigorous massaging effect acts on the teat tips during the relaxation cycle. These changed conditions are maintained during a constant period of 60 seconds before the system is switched over to normal milking operation during which the pulsator pressure merely increases during the relaxation cycle to atmospheric pressure. Since the underpressure customarily used is applied in the suction cycles during this preliminary phase as well, normal milk removal occurs in this procedure as soon as the milking cups are applied.

In accordance with German AS No. 1,956,196 a mechanical milk removal method with double chamber milking cups is known in which it has been found that after the double chamber cup has been applied to the teat, it climbs up on the teat if the cow has not been stimulated adequately. Since this can block the flow of milk completely, this known method provides for the reduction at the beginning of the milking operation both of the underpressure in the interior of the teat rubber and of the underpressure in the milking cup interspace during the suction phases in order to avoid injury to the teat and to make milk removal possible at all. A change in the underpressure in the milking cup interspace in response to the reduced underpressure in the interior of the teat rubber is effected to avoid what is termed the "ballooning" effect. Such a drop in the underpressure also occurs in particular at the conclusion of the milking operation when the flow of milk drops off. The underpressure changes in this case strictly in response to the measured flow of milk. It is also deemed expedient to lower the pulsator frequency if the measured flow of milk diminishes because this would reduce the teat massage frequency. A high massage frequency is considered disadvantageous if there is only a slight flow or no flow of milk whatsoever, since this could cause injury to the teats. On the whole, a change in the parameters occurs in the known method only in response to the measured flow of milk.

German OS No. 2,524,398 also discloses a milking procedure in which, unlike the hitherto known method according to German AS No. 1,956,196, the underpressure in the interior of the teat rubber is elevated to ensure that in fact milk is released. According to the methods known up to that time, this was apparently not always possible in animals which were very difficult to milk because the milking vacuum was too low at the beginning of the milking operation. To spare the teats, an accordingly reduced underpressure is supplied to the pulse space at the beginning of the milking operation when no milk or only little milk is flowing. In so doing, the underpressure prevailing in the pulse space is to be dimensioned such that the inner wall of the teat rubber is no longer completely open during the suction phase so that only the tip of the teat and not the whole teat is subjected to the underpressure. Moreover, this method is also supposed to restrict considerably the reflux of milk back against the teat, as this appears to be a dangerous factor in the spread of mastitis. This approach ensures that milk will be withdrawn reliably during the beneficial underpressure stage even in the case of animals difficult to milk. The initial phase, in which the underpressure in the pulse space is reduced, then changes over to the principal milking phase in response to the flow of milk.

U.S. Pat. No. 4,011,838 already reveals a milking method in which both the underpressure in the interior of the teat rubber and in the pulse space is reduced during a stimulation phase compared to the underpressures during the principal milking operation. According to a preferred embodiment, for instance, the underpressure in the interior of the teat rubber is 33 k Pa and 27 k Pa in the pulse space, both being considered to be especially suitable for the stimulation phase. These pressures both ensure that in normal dairy cows milk will flow immediately after relaxation of the tone of the streak canal muscles, i.e. after about 5 to 15 seconds. This process is completely independent of milk ejection, i.e. the cistern milk flows even in an unstimulated cow.

Accordingly, the regulation of the milking operation and thus the switch-over from the stimulation to main milking phase occurs in response to the flow of milk, in particular when this flow exceeds a value of 0.2 kg per minute. An auxiliary measure is provided, but only in hard-to-milk cows, that the switch-over occurs after a predetermined time of 61 seconds, even if the flow of milk has not exceeded the predetermined threshold value at this time. In addition, it is also deemed expedient that the pulse frequency be reduced during the stimulation phase below the pulse frequency in the principal milking phase.

Furthermore, a milking method is known from U.S. Pat. No. 4,211,184 in which the ballooning problem, the construction of the teat base by the annular lip of the teat rubber head and the climbing of the milking cup up the teat are supposedly solved. These objects are supposed to be achieved by measuring the amount of underpressure in the head space of the teat rubber and using this as a control signal for regulating the amount of underpressure in the pulse space in the sense that, as the underpressure in the head space increases, the underpressure in the pulse space decreases so that the teat rubber is not longer fully open during the suction phase. It is also mentioned quite passing that the means is also adapted to be used for initial stimulation. If one proceeds according to the teaching recited there, the result is that when a milking cup is applied to a teat which has not yet filled with milk and is therefore not engorged, the teat will not abut as yet against the teat rubber shaft, although there is already a full milking vacuum in the teat rubber interior. Under these conditions, the milking cup will climb up the teat until the annular lip at the head of the cup gains purchase on the teat and forms a seal. If the teat is not filled, this normally occurs at the level of the annular fold ("Fürstenberg'sche Venenring"). Only after the milking cup has fully climbed up the teat does the underpressure in the pulse space drop to about 17 k Pa owing to the high milking vacuum of approximately 50 k Pa in the head interior. This drop, however, does not restore the cup to its original position once it has climbed up the teat so that, as was already described in the German patent application P No. 30 01 963, the constriction of the sensitive teat base at the level of the annular fold by the annular lip of the teat rubber head exerts a pressure on the sensitive pressure receptors at the teat base which is unpleasant for the cow and which counteracts the stimulation effect. As far as this construction of the teat base is concerned, this known process is comparable to a very normal milking machine which is applied to an udder which has not yet been filled either. As far as the stimulation is concerned, however, a normal milking machine would probably even be superior to this process due to the substantially more intensive teat massage.

German OS No. 2,423,554 already disclosed a milking method as well as an apparatus in which an inadvertent opening movement of the teat rubber hose is supposed to be precluded during the milking phase by introducing a controlled valve into the respective pulsator lines leading to the pulse spaces of the milking cup, as this opening movement can cause a reflux against the teat. This results in an impact against the tip of the teat and can cause a mechanical transmission of bacteria into the interior of the teats in the cow. A control element which substantially constricts the cross section of the pulsator line leaving only a small cross section open is therefore introduced into each pulsator line at the beginning of a milking operation as long as the milk flow is still below a predetermined threshold. The result is that the underpressure in the milking cup interspace can only build up slowly during the suction phase, whereas when the switch-over from the suction phase to the relaxation phase occurs, air can flow in immediately and increase the pressure in the pulse space to atmospheric pressure almost instantaneously. Such a procedure is hardly suitable for stimulation, since very high forces are exerted on the yet unstimulated teat in which there is no milk flow, thereby leading to injuries in the teat cistern.

The afore-mentioned methods are advantageous in that the milker is no longer confronted with the difficulty of properly allotting his time. On the other hand, however, the afore-mentioned methods only show unsatisfactory results in practice compared to manual stimulation, in particular poorer udder emptying and longer milking times. These results are quite unexpectedly extremely similar in spite of the completely different interpretations of the stimulation phase.

SUMMARY OF THE INVENTION

The object of the present invention is to provide a method for mechanical milk removal with automatic stimulation which achieves optimum milkability, improved udder emptying, increased lactation output and enhanced work productivity during milking.

On the basis of the method cited at the outset, this object is accomplished in accordance with the invention in that no milk is removed for an interval of 40 to 90 seconds and preferably for an interval of 40 to 60 seconds after commencement of this stimulation phase and only subsequently thereto is milk removal begun.

This technical teaching was gleaned by virtue of the following observations and findings: even when milked by hand which, as far as the stimulation effect is concerned, probably comes closest to the natural extraction of milk, the animals are milked twice in short succession in some sheep herds (Ripasseo). The quantity of milk obtained during the second hand milking amounts to as much as 44% of the quantity obtained during the preceding milking. On the other hand, if the manual finish milking, which commonly follows machine milking in sheep nowadays, is replaced by renewed application of the machine after a short waiting period (double pose), there will be no losses in milk output in the case of Assaf and Awassi sheep. It was concluded from this observation that it is apparently not so much the type of stimulation which is important, but rather that the brief interval between the milking operations plays a major role. This infers first of all that a sheep, which as a rule has a higher stimulation requirement than a cow, experiences adequate stimulation by means of the milking machine—either with or without one of the known preliminary stimulation phases—. (This assumption is contradicted by the general opinion that a sheep cannot be stimulated mechanically.) The afore-cited facts indicate that the actual difficulty involved in mechanical stimulation is in the delay time—30 to 60 seconds as a rule—which elapses from the onset of stimulation until the full effect of the neuro-hormonal reaction (ejection of the alveolar milk).

If an animal which has not undergone preliminary stimulation is connected to the milking machine, the first milk to be withdrawn is the so-called cistern milk, which can be milked without any hormonal activity. This milk is secreted from the alveoli due to secretion pressure in the interval between milkings and is stored loosely in the lower cavities of the udder. If the cistern milk is withdrawn entirely as is normally the case in sheep with a milk flow time of 30 to 60 seconds, before the alveolar milk, which is still contained in the upper region of the mammary gland as in a sponge, has been ejected and thus made available, the result will be a process which is not only superficially analogous to the so-called finish milking, but which also has similar anatomicophysiological causes.

While milk is being removed, the internal udder pressure decreases linearly. The rate of decrease is dependent on the rate of milk removal and the amount of milk loosely stored and available in the udder. As the internal udder pressure drops, the milk ducts in the udder constrict, especially the lumen between the teat cistern and the gland cistern at the level of the annular fold ("Fürstenberg'sche Venenring"). This process continues until less milk can flow into the teat from above than can be milked below through the streak canal. This causes the milking vacuum to affect the teat cistern, to draw the teat together, thus causing the milking cup to lose purchase on the teat and to climb up the teat due to the milking vacuum, thereby completely blocking the flow of milk into the teat.

At the same time, the very sensitive internal teat mucosa rub against one another in this state due to the pulsation. This irritation results in a mechanical blockage as well as to a constriction of the milk discharge ducts in the udder dictated by the nervous system. This in turn is expressed as an unwillingness of the animals to be milked although the mammary gland has been emptied only in part. This situation is normally found in sheep and for this reason a pause is made after the removal of the amount of milk initially present in the udder. After a rest period, finish milking is carried out by hand.

It has been found that some high-grade sheep breeds (e.g. Prealpes du Sud) supply their milk to the milking machine in two clearly differentiated emissions. The flow of milk drops to almost zero between the two emissions. The renewed increase in the rate of milk flow, which is usually somewhat slower, is approximately 40 seconds after the beginning of milking. In these animals, which apparently have a lower stimulation requirement, the ejection thus occurs at least in time to just prevent premature total blockage owing to the increasing internal udder pressure. Hence, at least part of the alveolar milk can be obtained by machine. This cuts down on the amount of hand milking required to satisfactorily empty the udder.

In inadequately stimulated cows a clear drop in the flow of milk is frequently observed after 30 to 60 seconds. A total stoppage in the flow of milk, however, was found only in rare cases. This is explained by the fact that, although the rate of milk removal per teat is approximately the same as in the sheep, the cow has a greater quantity of cistern milk than a sheep so that the cistern milk is usually not yet completely removed before the alveolar milk from the upper region is released due to the stimulation action of the machine. It has been found, however, that the basic principle appears to be that delayed ejection always results in slower milking and poorer udder emptying. This can probably be explained by several reasons. Owing to the absence of an elevated internal udder pressure at the beginning of the milking operation, the animal has no desire to be milked. Complete relaxation of the tone of the smooth udder muscles therefore does not necessarily occur. Although delayed ejection also results in an increase in the internal udder pressure, the extent of the increase is never as great as during ejection immediately prior to milking due to the partially emptied storage volume in the lower cavities of the udder. In addition, such a delayed increase in internal pressure can only reverse the constriction of the udder milk ducts in part. This constriction was caused by the preceding, excessively rapid drop in the internal udder pressure during the first minute of the milking operation. Hence, the subsequent flow of milk from the upper regions of the udder continues to be correspondingly difficult. The poorer udder emptying is amplified even more by the normal stimulus which diminishes as milking continues. This factor plays an important role in cows which have an average milking time somewhat in excess of five minutes.

The conclusion which must be drawn from these findings is that no milk may be removed in any breed of milk-giving animal before the animal has been prepared for milking and is willing to be milked by adequate milk ejection and a high internal udder pressure. Removal of milk during the stimulation phase must necessarily result in a reduction in the quantity of milk as well as the other consequences which were described in this context at the outset.

As examinations have shown, it is not necessary for stimulation to be continued during the entire stimulation phase. It has been found to be adequate if stimulation is effected at the beginning of the stimulation phase and then interrupted. It is important that no milk be removed until after about 40 to 60 seconds after stimulation is begun. Stimulation, for instance, can still be quite sufficient even if the animal is stimulated only during the first 30 seconds, of example. The stimulation is then interrupted during a period of 10 to 30 seconds and the removal of milk is begun after expiration of this interruption period.

If the method in accordance with the invention is performed with the aid of a single chamber milking cup, an underpressure advantageously prevails in the interior of the milking cup during the stimulation phase sufficient to hold the milking cup on the teat without this underpressure being capable of removing milk from the teat. The actual stimulation can then occur, for instance, by heating the teat with the aid of an electrical heater, for example, which is built into the interior of the milking cup or with the aid of preheated air introduced into the single chamber cup, for example. An auxiliary remote-control valve can be provided on the outside of the single chamber cup which is open during the stimulation phase and otherwise closed.

In the afore-cited embodiment using a single chamber milking cup, the stimulation can also be effected by providing on or vacuum-evaporating onto the inside of the single chamber cup electrodes by means of which electrical pulses are applied to the teat preferably at a frequency between 5 and 70 Hz.

In accordance with another embodiment of the method in accordance with the invention which is performed with the aid of a double chamber milking cup, the underpressure in the pulsator line can be reduced during the stimulation phase relative to the milk removal phase such that the teat rubber remains in a more than semi-closed state even during the rest of the suction cycle, thus preventing the removal of milk. Owing to the teat rubber which folds in under these circumstances and abuts against the teat, the milking underpressure can be maintained at the same level as during the milking operation without removing milk during the stimulation phase. Moreover, the milking cup is prevented from undesirably climbing in this phase even if the teat is flaccid, since the teat rubber is always in a more or less folded-in state and merely oscillates. The reduction of the underpressure in the pulsator line can be effected in a simple manner by limiting the underpressure by means of an underpressure limiting valve which is mounted on the milking cup or in the pulsator line and is actuated as a function of time either by remote control or by simple actuating means. As soon as the underpressure limiting valve is deactivated, the underpressure in the pulsator line can again attain its full value as in the milking phase, whereupon the actual milking operation is initiated.

In addition to reducing the underpressure during the suction cycle, the pressure can also be increased during the relaxation cycles by connecting the pulsator line to an appropriate superpressure line. The result in this case is an especially good teat massage. Such an embodiment, however, requires a somewhat more sophisticated control circuit, since the teats must first be inserted into the milking cup before the superpressure is deactuated, since otherwise the teats will not be able to be inserted into the cup due to the superpressure.

The compressed air which is additionally introduced can have a pressure between 1.3 and 1.7 bar.

A stimulation can also be effected such that the milking cup interspace in a double chamber milking cup is continuously maintained under a superpressure which, however, is pulsated. The limits of the pulsating superpressure can range in this case between 1.2 and 1.7 bar. This type of stimulation provides a good teat massage. Moreover, no underpressure is needed in the interior of the teat rubber to hold the milking cup on the teat, thus sparing the teat. An appropriate superpressure pulsator valve should be provided in the pulsator line which is deactivated for the normal removal of milk or is switched for passage of milk. The conventional, known milking parameters are then set at the milking cup for milk removal.

In accordance with another embodiment of the invention, the stimulation can be effected such that the teat is heated when the milking cup is in place or that electrical pulses are supplied to the teat. In so doing, the underpressure in the space of the teat rubber is maintained at the same level as during the milking phase, while only the pulsator is stopped during its relaxation cycle, i.e. the milking cup interspace is thus under atmospheric pressure. Hence, the pulsator merely has to be restarted again to switch from the stimulation phase to the milking phase.

On the whole, the instant invention achieves optimum stimulation and thus optimum milk removal. Due to the fact that stimulation can be executed by the milking machine itself and that the stimulation phase is correlated accurately with the actual, immediately following milking phase as a function of time, the invention ensures that milk removal will not begin until after adequate stimulation has been achieved and, on the other hand, that milk removal does not begin long after the climax of stimulation has already passed. It has been found that udder emptying and the rate of milk flow were able to be reduced substantially owing to optimum stimulation. This means a two-fold advantage for the milker, viz. that he no longer has to stimulate an animal himself, but merely position the milking machine on the one hand and, on the other hand, that the quantity of milk obtained during finish milking is reduced by virtue of the good stimulation.

The afore-described milking method produces in most cows excellent stimulation results together with the clear, resultant, afore-mentioned improvements in several different aspects. It was also found that such mechanical stimulation is clearly superior to proper manual stimulation lasting 60 seconds. This can probably be explained by the fact that there is an addition of stimulation effects during mechanical stimulation, apparently due to the fact that all four teats are always stimulated simultaneously during mechanical stimulation, whereas during manual stimulation only two teats can be stimulated at the same time. Favourable stimulation—irrespective of the quantitatively measurable improvements during milk removal—is usually expressed in cows in that they stand completely still, rapt in the milking operation, with half-closed eyes and lop ears during the stimulation phase and the subsequent principal milking phase. Especially sensitive animals even react on occasion by lifting their tails for a time as evidence of pleasure.

A certain number of cows, however, will react less favourably to the above-described stimulation method. At the beginning of the stimulation phase, they also stand completely sill, rapt in the milking operation, frequently accompanied by raising the tail in some cases. In these cows as well, the udders and subsequently the teats become engorged and elongate. All these signs indicate that stimulation is very effective and that the cow's readiness to be milked is optimal. A distinct partial relaxation and a restoration of the teats to their original lengths is noted in this state. The animals become restless towards the end of the stimulation phase, whereas they were calm and rapt at the beginning of stimulation. In rare cases, it was observed that the cow even kicked the milking machine off towards the end of the stimulation phase. This phenomenon was usually accompanied by a subsequent slower or delayed production of milk and associated with an increase in the quantity of finish milking.

Long-term studies have determined that the aforementioned difficulties tended to occur more frequently under the following circumstances:

(a) in cows which stimulate themselves in part during the milking preparations, i.e. reflexes are already triggered due to optical, acoustical or olfactory stimuli (e.g. concentrated fodder being put in the milking stall) before the milking equipment is applied to the teats. Adequate autostimulation, however, is observed very rarely;

(b) in cows in which milk drips from the udder prior to milking although milk ejection has not yet occurred ("leaking cows");

(c) more frequently during the morning milking than during the evening milking operation;

(d) in cows which react very quickly and intensely to stimulation;

(e) more frequently in cows which were in the first third of lactation than in cows in the second or in particular in the last third of lactation;

(f) in cows which are in the second or third lactation compared to those in the first lactation;

(g) finally, in cows with a small udder and high milk output, i.e. so-called abdominal udders.

After puzzling about the particular course of stimulation in the afore-cited cases, it was found that a very high internal udder pressure occurs in some cases apparently at a time at which the ocytocin secretion has not yet achieved its full effect. This can happen for many different reasons. In particular, if the storage space (still) available in the gland cistern is small compared to the volume of the milk pressed out of the alveoli. (The ratio between the alveolar and gland cistern volumens can fluctuate between 30:70 and 70:30 in individual cows.) These internal udder pressures may reach and exceed 10 k Pa. If such a high internal udder pressure occurs, however, this high internal pressure will obviously be uncomfortable to the cow or even cause pain. This can cause secretion of adrenalin even during the stimulation phase, thus causing immediately relaxation of the tone of the smooth muscles of the udder. This causes the cow's readiness to be milked which was present at the moment to dissipate very suddenly. Furthermore, the adrenalin may block the receptors in the alveolar tissue not yet occupied by ocytocin, thereby preventing adequate milk ejection. This may ultimately put the cow in a condition at the end of the stimulation phase which is more unfavourable than if the animal had not been stimulated at all.

As several serial examinations have shown, the internal udder pressure is normally about 3 to 5 k Pa at the end of an adequate stimulation phase. Measurements, however, show a wide range of internal udder pressure varying from less than 1.5 k Pa to over 11 k Pa.

Another improvement of milk removal is therefore desired such that optimum stimulation of a cow is achieved prior to the principal milking operation without the occurrence prior to the beginning of the principal milking operation of an elevated internal udder pressure which would dissipate the animal's readiness to be milked.

This object is accomplished in accordance with the invention proceeding from a method of the afore-mentioned type in that during the stimulation phase the pulsation of the teat rubber occurs at a frequency which is at least 50% higher than the frequency during the principal milking operation and that during this period the maximum pulse underpressure in the pulse space of the milking cup is selected in response to the underpressure in the interior of the teat rubber and the fold-in pressure of the teat rubber such that it is in the range which satisfies the following formula:

$$\text{pulse underpressure (stimulation phase)} = 6 + \frac{\text{underpressure in teat rubber interior}}{3} + \frac{\text{fold-in pressure of teat rubber}}{4} \pm 5 \text{ [k Pa]}.$$

The method in accordance with the invention achieves an especially favourable, i.e. adequate stimulation with the resultant favourable consequences in almost all cows. The method is based on the knowledge that it is apparently especially favourable if an internal udder pressure of approximately 3 to 5 k Pa prevails at the end of the stimulation phase, i.e. approximately 40 to 90 seconds after the start of stimulation. This normally corresponds to a mean pressure increase of internal udder pressure from about 2.5 to 3.5 k Pa during the stimulation phase. It has been found that such a pressure increase should be attained if possible by the end of the stimulation phase on the one hand but, on the other hand, that no further pressure increase over and above that should occur, since such a further increase in internal udder pressure can eliminate the cow's readiness to be milked, as the pressure is unpleasant to the cow or can even cause pain. If an elevated internal udder pressure is attained rapidly and, in particular, prematurely, i.e. before 40 to 90 seconds have elapsed after the beginning of stimulation, it has not proved to be expedient to interrupt stimulation prematurely and begin the principal milking operation. It is extremely important both for the success of milking and for the long-term effect that an adequate stimulation phase be conducted with a delay interval of 40 to 90 seconds between the beginning of stimulation and the beginning of the principal milking operation. The stimulation procedure must therefore be conceived such that if possible all cows have reached an internal udder pressure of 3 to 5 k Pa after 40 to 90 seconds at the end of the stimulation phase, but that there be no further substantial increase in internal udder pressure above this pressure thereafter.

This is accomplished in that the maximum underpressure in the pulse space during the "suction phase" is selected accordingly in response to the underpressure in the interior of the teat rubber and the fold-in pressure of the teat rubber in conjunction with an increase in the pulse frequency. This effect of this measure is that no milk will be removed below an internal udder pressure of approximately 3 to 5 k Pa and, once the internal udder pressure increases above this value, only that quantity of milk will be removed which causes this internal udder pressure to be maintained at an internal pressure of approximately 3 to 5 k Pa throughout the stimulation phase.

The internal pressure in the interior of the teat rubber can be maintained at the level roughly used for the normal main milking phase. The underpressure in the interior of the teat rubber, however, can also be reduced during the stimulation phase. The method itself is not dependent on the level of the underpressure in the interior of the teat rubber as long as there is still an underpressure adequate to remove the milk as soon as the internal udder pressure exceeds the predetermined value. One important parameter for executing the procedure, however, is the selection of the pressure difference between the interior of the teat rubber and the pulse space. This pressure difference results from the afore-cited equation when a predetermined pressure prevails in the interior of the teat rubber, although it is of course dependent on the stiffness of the teat rubber employed. It has proved to be expedient to use the fold-in pressure as a reference parameter for the stiffness of the teat rubber. The fold-in pressure is understood in this context to mean the pressure difference between the interior of the teat rubber and the pulse space which folds the teat rubber in so far that there is contact between two opposing walls at some point. Assuming that the underpressure is the same in the interior of the teat rubber and the pulse space and the underpressure in the pulse space is reduced, the result will first of all be that the inner wall of the teat rubber will conform to the teat more and more until finally the teat rubber will collapse as the underpressure is reduced further in the pulse space. This means that the two opposing inner walls of the teat rubber will come to rest against one another in the space beneath the teat. When the teat rubber is in this condition, there is normally a passageway left open whose cross section corresponds more or less to an elongated eight. The milk can still flow through this passageway. The stiffer the teat rubber, the greater the wedging force which can be transmitted from the rubber wall to the tip of the teat for the purpose of closing, i.e. keeping closed, the streak canal. A very soft rubber (low fold-in pressure) can be readily compressed by a comparatively low pressure difference, but the wedging force which it can exert on the tip of the teat in an approximately radial direction is also low. Such a soft rubber tends to encompass the teat tip gently, thereby exerting substantially an omnidirectional pressure on the teat tip, but not a radial wedging force. Studies have shown that to achieve a specific closure force at the teat tip, all other factors being equal, the pressure difference between the pulse space and the interior of the teat rubber must be approximately 10% higher to achieve an equivalent closure force at the teat tip when using a soft rubber with a low fold-in pressure (6 k Pa) than when using a stiff rubber with a high fold-in pressure (15 k Pa).

For the determination of the necessary pressure difference between the underpressure in the pulse space during the "suction phase" and the underpressure in the interior of the teat rubber such that the internal udder pressure can be maintained at a value of approximately 3 to 5 k Pa during the stimulation phase, while any increase in the internal udder pressure above this level would infer the cited internal udder pressure due to the production of milk, it was assumed that the operation is carried out with an underpressure in the teat rubber interior during the stimulation phase which ranged approximately between 20 and 51 k Pa and that teat rubbers are used which have a fold-in pressure ranging approximately between 5 and 15 k Pa.

The type of stimulation is not so very important as long as a minimum stimulus level is reliably attained. This minimum value can fluctuate greatly. If the teat rubber movement, i.e. the amplitude of movement, is reduced according to the method as described by the invention to restrict the flow of milk in this way, it has been found that optimum stimulation can no longer occur under these circumstances. It was found in accordance with the invention, however, that optimum stimulation can be achieved even under these circumstances if the pulse frequency is increased appropriately. It has been found that a small amplitude of teat rubber movement and a higher pulse frequency produce in particular improved tone relaxation of the udder and especially the streak canal muscles compared to full teat rubber movement and a low frequency. This means that as the pulse frequency increases the pressure on the teat must normally be amplified in order to limit the flow of milk to the same extent. It has proved to be very advantageous, in particular at higher frequences (in excess of 120 cycles per minute) to choose the flank angle of the pulse curve to be as flat as possible during the stimulation phase, i.e. to make the pulse curve shape, which is usually more rectangular in shape, into a more sawtooth or directly triangular or even equilaterally triangular configuration during the stimulation phase. The flatter the increase or drop in pulse underpressure is, the more the pulses acting on the teats will be reduced. Furthermore, the rubber is better able to follow the pressure changes so that the danger of hard, uncontrolled rubber movement (snappy pulsation) is avoided. It is also advantageous that due to the triangular shape the pulse curve usually reduces quite clearly the proportion of the suction phase and that the interval of least pressure on the teat tip is cut very short. This allows the underpressure in the pulse space to be increased without at the same time increasing the flow of milk. This trick allows both the amplitude of the teat rubber movement and thus the stimulation stimulus to be increased while maintaining the flow of milk at the same level.

The improvement in muscle tone relaxation owing to higher pulse frequencies compensates substantially the reduction in the suction applied to the teat tips owing to the flat flank angle. The tendency, however, is for the pressure on the teat to be increased somewhat when the frequency is increased. Pulse frequencies of 140 to 280 cycles per minute have proved to be especially favourable. In the short term, the most intensive possible stimulation, i.e. a high pulse frequency (up to 450 cycles per minute) appears to be more suitable than an amplitude which is too low. There are indications, however, that a somewhat less intensive stimulation is preferable to eliminate the danger of a certain amount of overstimulation of habit-forming effect, particularly in the long term. The method in accordance with the invention is applicable not only to cows, but also to sheep and goats, although the lower pressure difference values resulting from the above equation should be used in the latter case.

All the above relates to a so-called double chamber milking cup, i.e. a milking cup featuring a teat rubber lining in which an interspace is formed between the teat rubber and the milking cup casing which is connected to a pulsator. The method according to the invention, however, can also be executed using a so-called single chamber milking cup, i.e. a milking cup in which there is no change between the suction and relaxation cycles, but in which the teat tip is continuously subjected to an underpressure without a teat rubber massage. In this case, the underpressure in the milking cup must be selected when the milking cup is in place during the stimulation phase such that the desired internal adder pressure can build up during the stimulation phase in spite of the underpressure applied. Hence, when a single chamber cup is employed, the inventive method must be carried out such that a pulse volume is pulsated at the upper edge of the single chamber cup during the stimulation phase at a frequency of more than 50% the frequency in the principal milking phase, and that the underpressure in the interior of the teat rubber is limited to approximately 18 to 25 k Pa during this time.

When stimulating the animal, it is not necessary that pulsation be effected on the teat during the entire stimulation phase. On the contrary, such pulsation need be performed only during part of the stimulation phase, i.e. at the beginning. If the pulsation is turned off for the remainder of the stimulation phase, for instance, then attention must be given to ensure that the milking cup is in the "suction phase position" and that, as it is in a static state, an adequate pressure difference prevail between the interior of the teat rubber and the pulse space.

The pressure difference between the interior of the teat rubber and the pulse space can be set very simply by means of an underpressure limiting valve which is interposed, for instance, in the pulsator connecting line.

Stimulation can also be achieved in that a pulsating pressure is supplied to the pulse space of the milking cup during the stimulation phase. This pressure increases not only to atmospheric pressure, but even to a superpressure which can range approximately between 0 and 25 k Pa. Owing to the fact that the pressure in the pulse space now varies between a maximum underpressure and an upper superpressure, the teat is subjected to an enhanced stimulation effect which can be advantageous in less sensitive and less well-bred cows.

An apparatus of the type mentioned at the outset has proved expedient in executing the method in accordance with the invention and is characterized in that a shunt line including a first controllable port is provided in the main line supplying said underpressure source, that a bypass line is provided which circumvents said adjustable throttle, that a second adjustable throttle is provided in said bypass line, and that there is provided in the main line a first cut-off device which is adapted to be closed during the stimulation phase and is circumvented by the shunt line and there is provided in the bypass line a second cut-off device which is adapted to be closed during the main milking operation. Such a design makes it possible to adjust easily and accurately the pulse frequence which varies during the stimulation phase compared to the principal milking phase as well as the underpressure prevailing in the pulse space without having to make substantial changes in the pulsators already present.

It is also expedient for many applications to provide a third cut-off device adapted to be closed during the stimulation phase in the line for supplying atmospheric air to the switch-over device and to provide a second shunt line circumventing said cut-off device, said line including a second controllable port. It is possible in this way to adjust the increasing and decreasing slopes of the underpressure curve in the pulse space accurately and as desired and particularly such that both the rise and fall of the slope are equal or that a needle-shaped pulse with comparatively steep increasing and decreasing slopes is obtained.

In accordance with an expedient embodiment, the first cut-off device is formed in the main line by a membrane valve, the control side of which is connected both to a line for supplying atmospheric air and to the underpressure source via a throttle. According to another further development, the second cut-off device includes a pneumatically controllable membrane, the control side of which is connected both with a line for supplying atmospheric air and to the underpressure source via a throttle. In these cases, an especially simple time control of the stimulation phase and a change-over to the principal milking phase can be achieved as a function of time in that a fourth cut-off device adapted to be closed in response to a preselected time control is provided in the line for supplying the atmospheric air.

BRIEF DESCRIPTION OF THE DRAWING

The invention will now be explained in detail in the following with reference to the enclosed drawing, in which:

FIG. 2 is an example for the progress of the underpressure in the pulse space as a function of time, the ordinate representing the underpressure in kilopascal and the abscissa being the time. (The constant underpressure in the interior of the teat rubber is 50 k Pa; the maximum underpressure in the pulse space is 24 k Pa; the frequency is equal to 200 cycles per minute), FIG. 3 is a drawn-out curve of similar representation as in FIG. 2 with the following values: the constant underpressure in the interior of the teat rubber is 43 k Pa; the maximum underpressure in the pulse space is 22.5 k Pa; the frequency is 240 cycles per minute. In addition, the normal pulse curve during the principal milking operation is illustrated as a dotted line for comparison purposes, and FIG. 4 schematically illustrates a pulsator as shown in FIG. 1 which has a similar mode of operation but is electrically controlled.

DESCRIPTION OF THE PREFERRED EMBODIMENT

Figure 1:
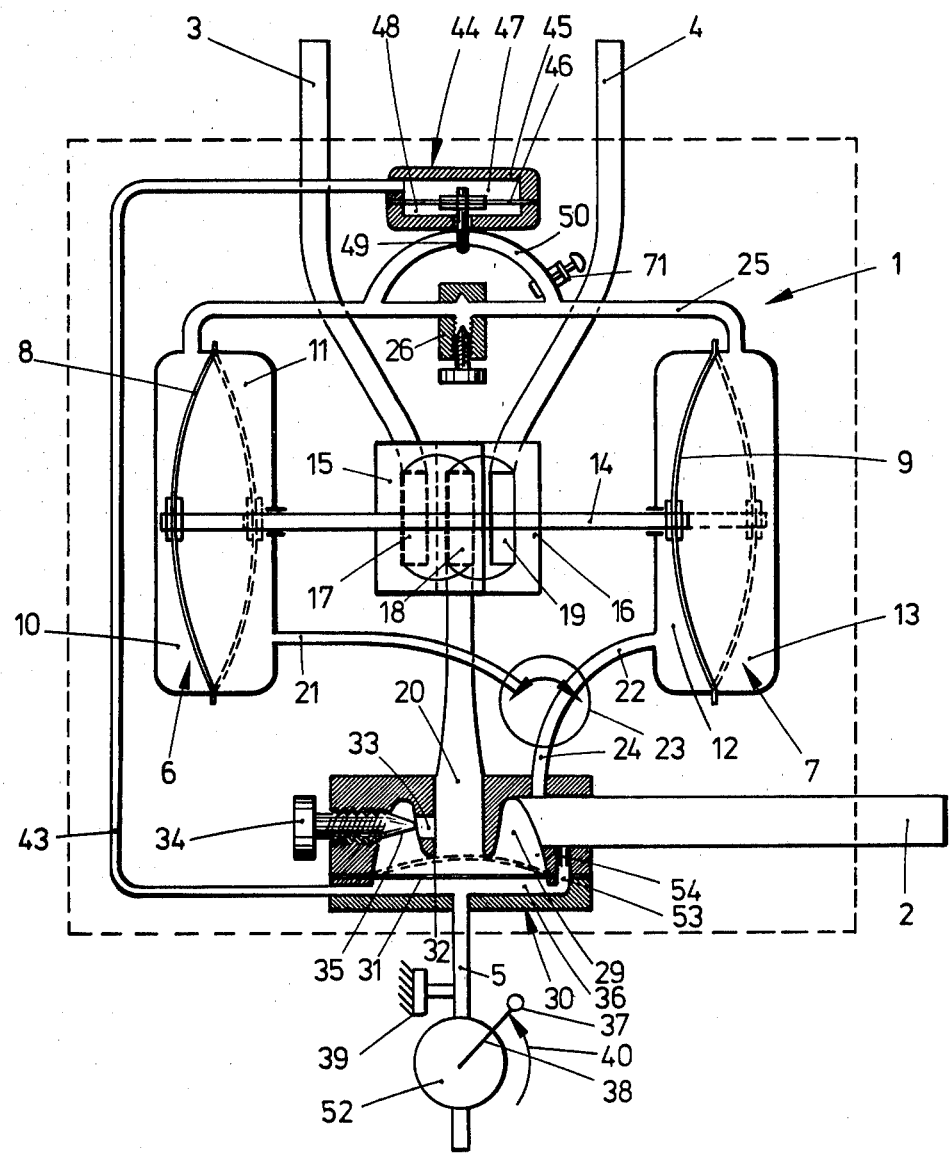
FIG. 1 schematically illustrates a pulsator designed in accordance with the invention.

FIG. 1 schematically illustrates a pulsator 1 which includes a connecting line 2 to an underpressure source, two lines 3 and 4 leading to the pulse spaces in milking cups (not shown), and a supply line 5 for atmospheric air. At its principal component, the pulsator comprises two pressure capsules 6 and 7 each of which is subdivided by a membrane 8 and 9 into two spaces 10 and 11 or 12 and 13. The membranes are connected by a rod 14 the ends of which are secured to the middle of the respective membrane. A slide 15 is mounted on the rod 14 and slides on a plate 16 which is designed with slots 17, 18, 19 extending parallel to one another and perpendicular to the axis of said rod 14. The two outer slots 17 and 19 communicate with the line 3 or line 4 leading to the pulse spaces, whilst the middle slot 18 sealingly communicates with a line 20 which in turn communicates with the connecting line 2 which then leads to an underpressure source (not shown).

Both spaces 11 and 12 of the pressure capsules 6 and 7 communicate via lines 21, 22, respectively, with a control unit 23 known per se. The control unit 23 communicates via a line 24 with line 2 leading to the underpressure source. Both spaces 10 and 13 of the pressure capsules 6 and 7 communicate via a connecting line 25 in which an adjustable throttle 26 is located, for example in the form of a screwable metering screw projecting into the line. The adjustable throttle serves to vary the cross section of the connecting line 25.

The pulsator described hereinbefore is known with the exception of the supply line 5 for atmospheric air.

In accordance with the invention, the connection between line 2 and line 20 is now designed such that line 2 terminates in an annular space 29 in a control unit 30.

The annular space opens towards the same side as the end of line 20. Both openings can be closed by a membrane 31 when this abuts against a surface 32. If the membrane 31 is in its non-deflected position, then the end of line 20 communicates with the annular space 29 and via this with line 2. Parallel to this connection there is a thru-hole 33 which connects line 20 and the annular space 29. This cross section of this hole 33 can be varied with the aid of a control screw 34 which has a conical front surface 35. The thru-hole 33 in conjunction with the control screw 34 forms an underpressure limiting valve.

Another space 36 in which the supply line 5 for atmospheric air terminates is formed on the side of the membrane 31 facing away from the end of line 20. The supply line 5 for atmospheric air is normally open. This connecting line preferably consists of a flexible hose. This can be clamped by the end 37 of a lever 38, thus closing it, when the end 37 presses the hose of line 5 against a stationary stop 39. The lever 38 is part of a timer which can be present for a specific lead time corresponding to the length of the stimulation phase. While the preset time elapses, the lever 38 rotates counterclockwise in the direction indicated by arrow 40, thus coming to rest against line 5 at the end of the predetermined interval.

Space 36 in the control unit 30 also communicates via a line 43 with a pneumatic hose clamp 44. The hose clamp 44 consists of a pressure capsule housing 45 subdivided into two spaces by a membrane 46. Line 43 terminates in space 47. Space 48 is vented to the atmosphere, since a hook 49 extends through the wall of the housing and is attached to membrane 46. The hook 49 has a bent end which hooks in back of the bypass line 50 which is designed in the form of a flexible hose and which constitutes a line circumventing the adjustable throttle 26 in connecting line 25. The bypass line 50, in turn, can be equipped with an adjustable throttle 71.

A connecting line 53 is also provided between line 2 and space 36 in the control unit 30. A throttle 54 with a substantially smaller cross section than line 5 is located in this connecting line 53.

The mode of operation of the pulsator is as follows: At the beginning of the stimulation phase the timer 52 is set for the predetermined stimulation interval by turning the lever 38 clockwise. In so doing, the connecting line 5 opens so that atmospheric pressure prevails in the space 36 of the control unit 30 and via line 43 in the space 47 in the pneumatic hose clamp 44 as well. In this condition, the pneumatic hose clamp 44 opens the bypass line 50. Moreover, as atmospheric pressure on the one hand and an underpressure via line 2 on the other hand prevail on the two different sides of the membrane 31, the membrane 31 in the control unit 30 is deflected such that it presses against the surface 32, thereby closing off the direct passage between line 2 and line 20 via the annular space 29. Hence, the underpressure from line 2 can only pass through the annular space 29 and the thruhole 33 into line 20 and via the slot 18 alternately into one of said pulse lines 3 and 4.

For the proper functioning of the control unit 23, it is important that this be connected directly to the line 2 leading to the underpressure source and not to line 20. The control unit 23 serves to convey the underpressure from the underpressure source prevailing in the line 2 via line 24 alternately into space 12 via line 22 or into space 11 of the pressure capsules 7 or 6 via line 21. Accordingly, the membrane 8 and 9 as well as the attached rod 14 are deflected alternately to the right and left. The fluid in spaces 13 and 10 of pressure capsules 6 and 7 is equalised via connecting line 25 and in particular via the bypass line 50 which is open at this moment. Owing to the open bypass line 50, this equalisation can occur very rapidly so that a high-speed reciprocating movement of the rod 14 is possible, i.e. a high pulsation frequency. The desired pulsation frequency in the stimulation phase can be adjusted by the adjustable throttle 71 in the bypass line 50. Each reciprocation of the rod 14 is accompanied by a reciprocating of the slide 15 mounted thereon. This causes the slots 17 and 18 to be interconnected when the slide is located in the final left position illustrated in the drawing so that the underpressure can be conveyed from line 20 into the pulsator line 3, while atmospheric pressure can be conveyed into the pulsator line 4 through the open slot 19. When the rod 14 is located in the final right position, the slide 15 is disposed such that it establishes a connection between the slots 18 and 19 of plate 16, thereby allowing the underpressure to flow from line 20 into the pulsator line 4, whilst slot 17 is now open, thus permitting atmospheric pressure to flow through pulsator line 3.

Adjusting the size of the thru-hole 33 determines how rapidly an underpressure can build up in line 20 and, at the same time, which level this underpressure can reach before another switch-over takes place by a displacement of rod 14. In this manner, the slope increase can be adjusted exactly as a function of time during the increase in underpressure in the pulse space. The pitch of the slope decrease of the pulsator curve, as illustrated in detail in FIGS. 2 and 3, can be adjusted similarly by accurately adjusting the supply of atmospheric air to slots 17 and 19. Such a device is simple to manufacture and for this reason is not explained in detail.

At the end of the stimulation phase, which comes at a time determined by the timer 52, the end 37 of the lever 38 comes to press against the hose of the connecting line 5, thereby clamping the hose closed and thus interrupting the supply of atmospheric air. As of this moment, the underpressure from line 2 can begin to build up in the space 36 of the control unit 30 via throttle 54. As soon as an equal underpressure prevails in space 36 as in line 2, the membrane 31 returns to its non-deflected position, thereby establishing a large cross-sectional connection between line 2 and the underpressure line 20 via the annular space 29. This permits a large underpressure to build up in line 3 or line 4 and thus in the respective pulse spaces of the milking cup within a comparatively brief time each time the slide 15 reverses direction. The level of the underpressure in the suction phases respectively corresponds to the milking vacuum.

While the underpressure is building up in space 36 of the control unit 30, it is also conveyed through line 43 into space 47, causing the membrane 46 to be deflected outward in FIG. 1. This causes the hook 49 to be drawn upward, thereby pulling the hose 50 against the outside of the pneumatic hose clamp, thus clamping the hose 50 closed. This closes the bypass line 50. In this stage, the pressure between spaces 10 and 13 of pressure capsules 6 and 7 now can be equalised via line 25 and the adjustable throttle 26. The throttle 26, however, has been preset so as to only allow the pulsator to oscillate at a frequency of approximately 60 cycles per minute. This frequency corresponds to the pulsation frequency customarily used during the main milking phase.

The pulsator in accordance with the invention thus makes an exact setting of the milking parameters possible during the stimulation phase and at the same time an automatic switch-over to the milking parameters in the main milking operation after expiration of the stimulation phase.

The control unit 30 must not necessarily be disposed in line 2 leading to the underpressure source. On the contrary, one such control unit could be respectively disposed in pulsator lines 3 and 4 (alternating operation). Only one common control unit for all pulsator lines together would be required for direct operation. One advantage of these arrangements would be that the pulsators present would hardly have to be changed.

FIGS. 2 and 3 illustrate the course of the pressure during the stimulation phase in the pulse space of a milking cup whose pulsation is controlled by the pulsator shown in FIG. 1.

The ordinate in FIG. 2 represents the underpressure in the pulse space, expressed in k Pa. The value 0 consequently represents atmospheric pressure. The line at 50 k Pa indicates the level of the underpressure which is supplied during the main milking phase both at a constant level to the interior of the teat rubber and at a maximum level to the pulse space during the suction phase. If one cycle of the pulse underpressure is observed during the stimulation phase, the underpressure increases continuously starting approximately at point P1, at which atmospheric pressure prevails in the pulse space, until it reaches a maximum value of 24 k Pa at point P 2. After attaining this maximum underpressure, a continuous decrease in the underpressure then ensues until atmospheric pressure is again reached at point P 3. As the curve clearly shows, the underpressure builds up during the interval beween P 1 and P 2 and decays in an almost similar manner during the interval between P 2 and P 3. This means that the pitch of the slope increase 61 of the curve 60 corresponds approximately to the pitch of the slope decrease 62 of curve 60. Moreover, this pitch is comparatively small. This means, however, that no abrupt pressure change occurs in the pulse space during each cycle and thus that an intense pulse does not act on the teat during each cycle either.

Curve 60 also reveals clearly that the maximum underpressure in the pulse space is attained and maintained only for a very brief moment, viz. during the interval at points P 2. As already mentioned above, the difference between the pressure prevailing in the interior of the teat rubber and the maximum underpressure in the pulse space in conjunction with the fold-in pressure of the teat rubber determines the minimum holding force at the teat tip during each pulse cycle. The longer the interval during which only a small holding force acts on the teat tip, the more milk can be removed due to the applied underpressure in the interior of the teat rubber. By virtue of the fact that the maximum underpressure in the pulse space is always attained only for an extremely brief interval, the milk actually withdrawn from the teat can be regulated very accurately and kept very small. This allows the internal udder pressure to be maintained in its entirety at the desired value during the stimulation phase. The curve 60 shown in FIG. 2 illustrates a pulsation curve with a frequency of 200 cycles per minute. Such a pulsation frequency has proved to be very good for stimulation.

A pulsation curve similar to the one in FIG. 2 is shown as a solid line in FIG. 3. During this stimulation, an underpressure of 43 k Pa was maintained in the interior of the teat rubber. The underpressure in the pulse space was controlled corresponding to curve 70 such that it fluctuated cyclically between atmospheric pressure and a maximum underpressure of 22.5 k Pa. The rising and falling slopes of the curve are approximately equally steep and comparatively flat during each cycle in this example as well. The maximum underpressure of 22.5 k Pa is also maintained only for an extremely brief moment. The frequency of the pulsation amounted to 240 cycles per minute. The afore-cited conditions for the stimulation phase have proved to be especially favourable. A curve 80 is also illustrated as a dotted line in FIG. 3 for purposes of comparison. This curve 80 corresponds to the pulsation curve conventionally employed during the principal milking operation. The characteristics of this curve are that the maximum underpressure is at 50 k Pa, that the pulsation frequency is 60 cycles per minute and that the suction phases are longer compared to the relaxation phases.

Figure 4:
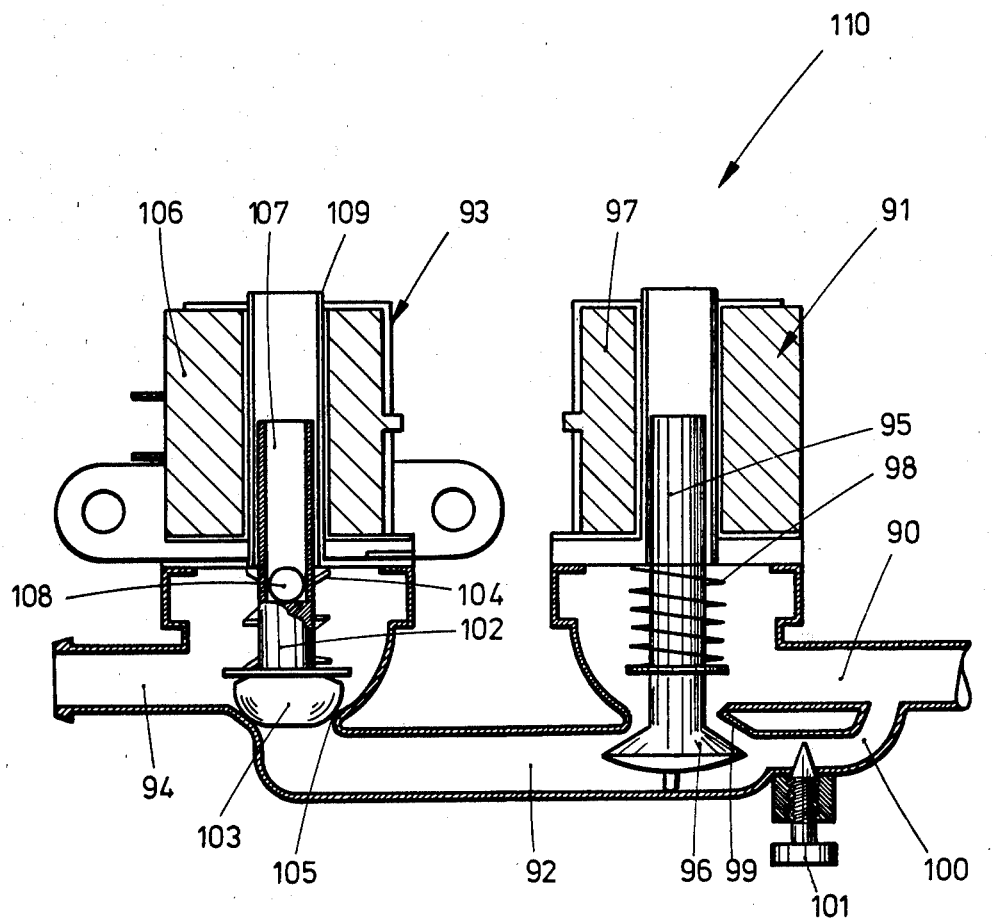

FIG. 4 shows in a schematic illustration another possible embodiment for a pulsator for setting the milking parameters during the stimulation and main milking phases by electric control means. A first solenoid valve 91 is located in a line 90 which issues from the underpressure source. The outflow line 92 of the first solenoid valve 91 communicates via a second solenoid valve 93 with the line 94 leading to the pulse spaces. The first solenoid valve 91 includes an armature 95 whose lower end is designed as a valve seat 96. When the solenoid 97 is energised, the valve seat 96 is drawn up against a valve surface 99 against the force of a spring 98 which keeps the solenoid valve open when not energised. In this manner, the connection between line 90 and line 92 is interrupted by the solenoid valve 91 when the solenoid 97 is energised.

An adjustable throttle 101 is disposed in a line 100 which circumvents the solenoid valve 91 and establishes a connection between line 90 and line 92.

The connecting line between lines 92 and 94 is adapted to be closed by a second solenoid valve 93. The armature 102 of this second solenoid valve, which also includes a valve head 103 at its lower end, is prebiased against a valve seat 105 by a spring 104. As long as the magnetic coil 106 of the solenoid valve 93 is not energised, the connection between lines 92 and 94 is thus closed.

The armature 102 is provided with a blind hole 107 which extends parallel to the axis thereof and which is open at the top. A transverse hole 108 terminates in said blind hole. The aperture of the transverse hole 108 is located in a position in which it communicates directly with line 94 when the magnetic coil 106 is not energised and the solenoid valve is therefore closed. The external aperture of the transverse hole 108, however, is sealingly closed by a pipe sleeve 109 when the magnetic coil 106 is energised and the armature 102 is located in the raised position. In moving the armature 102 vertically in the plane of the drawing of FIG. 4, it passes through the pipe sleeve 109. Hence, when the magnetic coil 106 is energised, the valve head 103 thus opens the passage between lines 92 and 94.

The mode of operation of the pulsator illustrated in FIG. 4 is as follows: Before stimulation begins, the adjustable throttle is set for a predetermined flow rate. The magnetic coil 97 is energised so that the first solenoid valve 91 is closed. The solenoid valve 93 is then controlled by the desired pulse frequency during the stimulation phase so that this solenoid valve opens and closes in time with the desired pulse frequency. Every time this second solenoid valve 93 closes, a connection is interrupted between line 94 via lines 92 and 100 to line 90 which communicates with the underpressure source (not shown). When the second solenoid valve 93 is in this position, however, the aperture of the transverse hole 108 is released by the pipe sleeve 109. This establishes in this way a connection between line 94 and the atmospheric pressure via the transverse hole 108 and the blind hole 107 so that atmospheric pressure can build up in line 94. If the magnetic coil 106 is then energised, the armature 102 will be drawn into the magnet, thereby causing the pipe sleeve 109 to close the aperture of the transverse hole 108. At the same time, the valve head 103 is raised from the valve seat 105 so that line 94 now communicates with line 90 via lines 92 and 100. Owing to the throttle 101 in line 100, the desired underpressure can then build up slowly in line 94 in accordance with this reduced flow rate. This permits the pitch of the rising slope of the pulse curve to be set exactly and as desired from atmospheric pressure to the desired underpressure. The pitch of the falling slope from the maximum pulse underpressure back to atmospheric pressure could be controlled in an appropriate manner such that an adjustable throttle is also provided at the upper end of the pipe sleeve 109.

The frequency at which the second solenoid valve 93 is vibrated can range between 90 and 400 cycles per minute.

If the apparatus is switched from the stimulation phase to the main milking phase, the magnetic coil 97 is energised, thereby opening the solenoid valve 91. This establishes a main connection between lines 90 and 92 so that the rapid built-up of an adequate underpressure can occur in the pulse spaces. At the same time, the frequency of the second solenoid valve 93 is reduced to the usual frequency of 60 cycles per minute for the principal milking operation.

The embodiments of the invention in which an exclusive property or privilege is claimed are defined as follows:

1. In a method for mechanical milk removal in which a predetermined underpressure is applied to the interior of a milking cup applied to a teat to remove the milk and a pulsation of a teat rubber is effected at a predetermined frequency and intensity, and while the milking cup is in place the teat is stimulated during a stimulation phase for a predetermined interval prior to the principal milking operation, the improvement comprising wherein no milk is removed for an interval in the range of 40 to 90 seconds after commencement of the stimulation phase and only immediately subsequently thereto is milk removal begun and wherein the pulsation frequency during the stimulation phase is higher than in the milk removal phase.

2. The method according to claim 1, wherein the teat is stimulated only during part of the stimulation phase.

3. The method according to claim 2, wherein the teat is stimulated for approximately 30 seconds and, after an interruption of approximately 10 to 30 seconds, milk removal is begun.

4. The method according to one of claims 1 to 3 using a double chamber milking cup, wherein during the stimulation phase an underpressure to a pulsator line is reduced to such an extent during the rest of the suction phase that the teat rubber can also open during said rest of the suction phase, but only so far that no milk is withdrawn.

5. The method according to claim 4, wherein the underpressure in the pulsator line is reduced by limiting the underpressure by means of an underpressure limiting valve.

6. The method according to one of claims 1 to 3, wherein during the stimulation phase compressed air is introduced into said interior of said milking cup during each of the relaxation phases.

7. The method according to one of claims 1 to 3, wherein during the stimulation phase a pulsating superpressure is applied to said interior of said milking cup and wherein no or only a slight underpressure is applied to the teat rubber interior.

8. The method according to claim 7, wherein the superpressure is pulsed approximately between 1.2 and 1.7 bar.

9. The method according to claim 7, wherein the pulsation frequency during the stimulation phase is increased relative to the main milking phase.

10. The method according to claim 9, wherein the pulsation frequency is increased to the range of 100 to 170 cycles per minute.

11. The method according to one of claims 1 to 3 using a single chamber milking cup, wherein an underpressure is applied during the stimulation phase merely to cause the milking cup to adhere to the teat and that a stimulation is achieved by applying to the teat electrical pulses in the range of 5 to 70 Hz.

12. In a method for mechanical milk removal in which a predetermined underpressure is applied to the interior of a milking cup applied to a teat to remove the milk and a pulsation of a teat rubber is effected at a predetermined frequency and intensity, and during a stimulation phase while the milking cup is in place the teat is stimulated for a predetermined interval prior to the principal milking operation, the improvement comprising wherein during the stimulation phase the pulsation of the teat rubber occurs at a frequency which is at least 50% higher than the frequency during the principal milking operation and wherein during this period the maximum pulse underpressure in the interior of the milking cup is selected in response to the underpressure in the interior of the teat rubber and the fold-in pressure of the teat rubber such that it is in the range which satisfies the following formula:

$$\text{pulse underpressure} \atop \text{(stimulation phase)} = 6 + \frac{\text{underpressure in teat rubber interior}}{3} + \frac{\text{fold-in pressure of teat rubber}}{4} + 5 \text{ [k Pa]}.$$

13. The method according to claim 12, wherein the stimulation phase has a duration in the range of 40 to 90 seconds.

14. The method according to claim 12, wherein the pulsation of the teat rubber in the stimulation phase occurs at a frequency from 140 to 280 cycles per minute.

15. The method according to claim 12, wherein the teat is stimulated only during part of the predetermined duration of the stimulation phase.

16. The method according to claim 12, wherein the increase and decrease in the underpressure in said interior of said milking cup is controlled such that a substantially constant increase and decrease in the underpressure results during each stimulation phase.

17. The method according to claim 16, wherein the increase and decrease in the underpressure progress almost identically as a function of time.

18. The method according to claim 17, wherein a switch-over from increase to decrease of the underpressure occurs directly as soon as the predetermined underpressure is reached in said interior of said milking cup.

19. The method according to claim 16, wherein the maximum underpressure in said interior is set during the stimulation phase by means of an underpressure limiting valve which communicates with the pulsator line.

20. The method according to claim 12, wherein a pressure is applied to said interior during the stimulation phase and pulses between the pulse underpressure derivable from the formula given in claim 12 and an excess pressure ranging from 0 to 15 k Pa.

21. The method according to claim 12, wherein the pulsation of the teat rubber in the stimulation phase occurs at a frequency from 160 to 220 cycles per minute.

22. In an apparatus for mechanical milk removal in which a predetermined underpressure is applied to the interior of a milking cup applied to a teat to remove the milk, comprising a pulsator connected on the one hand to an underpressure source and on the other hand to pulsator lines supplying the pulse spaces of the milking cup, said pulsator having two membranes each located inside a pressure capsule, said membranes being interconnected by a linkage and which subdivide each pressure capsule into two separate spaces, two spaces of which communicate with one another via a first adjustable throttle, while the two other spaces of which are adapted to be selectively connected via a control unit to the underpressure source, and further comprising a switch-over device which is connected to said linkage and which serves to selectively connect at least one group of pulsator lines to the underpressure source and to fresh atmospheric air, the improvement comprising wherein a shunt line including a first controllable port is provided in a main line supplying said underpressure source, wherein a bypass line is provided which circumvents said adjustable throttle, wherein a second adjustable throttle is provided in said bypass line, and wherein there is provided in the main line a first cut-off device which is adapted to be closed during the stimulation phase and is circumvented by the shunt line and there is provided in the bypass line a second cut-off device which is adapted to be closed during the main milking operation.

23. The apparatus according to claim 22, wherein the control unit is connected directly to the main line leading to the underpressure source.

24. The apparatus according to claim 22 or 23, wherein the first cut-off device is formed in the main line by a membrane valve, the control side of which is connected both to a line for supplying atmospheric air and to the underpressure source via a throttle.

25. The apparatus according to claim 22 or claim 23, wherein the second cut-off device includes a pneumatically controllable membrane, the control side of which is connected both with a line for supplying atmospheric air and to the underpressure source via a throttle.

26. The apparatus according to claims 22 or 23, wherein a third cut-off device adapted to be closed in response to a preselected time control is provided in the line for supplying the atmospheric air.

27. The apparatus according to claim 26, wherein the second cut-off device includes a pneumatically controllable membrane, the control side of which is connected both with a line for supplying atmospheric air and to the underpressure source via a throttle.

28. In an apparatus for mechanical milk removal in which a predetermined underpressure is applied to the interior of a milking cup applied to a teat to remove the milk, comprising a pulsator connected on the one hand to an underpressure source and on the other hand to the pulsator lines supplying pulse spaces of the milking cup, the improvement comprising wherein a first and second solenoid valve are disposed in a line extending from the underpressure source to the pulsator lines, wherein a bypass line is provided which includes an adjustable throttle and that circumvents said first solenoid valve, and wherein in its first position the second solenoid valve closes the connection between the underpressure source and the pulsator lines and connects these to the atmosphere and in its second position connects the pulsator lines to the underpressure source, while interrupting the connection between the pulsator lines and the atmosphere.

29. The apparatus according to claim 28, wherein the second solenoid valve can be switched between said first and second positions at a frequency of up to 400 cycles per minute.

30. The apparatus according to claims 28 or 29, wherein a time control device is provided for holding the first solenoid valve in its closed position during the stimulation phase and in the open position during the main milking operation.

31. In a method for mechanical milk removal in which a predetermined underpressure is applied to the interior of a milking cup applied to a teat to remove the milk and a pulsation of a teat rubber is effected at a predetermined frequency and intensity, and while the milking cup is in place the teat is stimulated during a stimulation phase for a predetermined interval prior to the principal milking operation, the improvement comprising wherein no milk is removed for an interval in the range of 40 to 60 seconds after commencement of the stimulation phase and only immediately subsequently thereto is milk removal begun and wherein the pulsation frequency during the stimulation phase is higher than in the milk removal phase.

32. The method according to claim 31, wherein the teat is stimulated only during part of the stimulation phase.

33. The method according to claim 31 or claim 32 using a double chamber milking cup, wherein during the stimulation phase an underpressure to a pulsator line is reduced to such an extent during the rest of the suction phase that the teat rubber can also open during said rest of the suction phase, but only so far that no milk is withdrawn.

34. The method according to claim 31 or claim 32, wherein during the stimulation phase compressed air is introduced into said interior of said milking cup during each of the relaxation phases.

35. The method according to claim 31 or claim 32, wherein during the stimulation phase a pulsating superpressure is applied to said interior of said milking cup and wherein no or only a slight underpressure is applied to the teat rubber interior.

* * * * *